United States Patent
Owens (10) Patent No.: US 9,346,382 B1
(45) Date of Patent: May 24, 2016

(54) VERSATILE ARM REST FOR A VEHICLE

(71) Applicant: James Owens, Birmingham, AL (US)

(72) Inventor: James Owens, Birmingham, AL (US)

(73) Assignee: Jay's Enterprise, LLC, Birmingham, AL (US)

( * ) Notice: Subject to any disclaimer, the term of this patent is extended or adjusted under 35 U.S.C. 154(b) by 0 days.

(21) Appl. No.: 14/583,544

(22) Filed: Dec. 26, 2014

(51) Int. Cl.
*B60J 9/00* (2006.01)
*B60N 2/46* (2006.01)

(52) U.S. Cl.
CPC ............ *B60N 2/4666* (2013.01); *B60N 2/4673* (2013.01)

(58) Field of Classification Search
CPC ............................. B60N 2/4666; B60N 2/4673
See application file for complete search history.

(56) References Cited

U.S. PATENT DOCUMENTS

| | | | | |
|---|---|---|---|---|
| 2,569,436 A * | 10/1951 | Allen, Sr. | ............ | B60N 2/4666 296/153 |
| 2,577,561 A | 12/1951 | Atwater | | |
| 3,603,637 A | 9/1971 | Depinto | | |
| 4,592,584 A | 6/1986 | White, Jr. | | |
| 4,890,878 A | 1/1990 | Harary et al. | | |
| 5,205,606 A * | 4/1993 | Cassese | ............... | B60N 2/4666 296/153 |
| 5,320,401 A | 6/1994 | Ott | | |
| 5,722,713 A | 3/1998 | Santa Cruz et al. | | |
| 5,964,497 A * | 10/1999 | Wiles | ................... | B60N 2/4666 296/153 |
| D419,130 S | 1/2000 | Dyment | | |
| 6,120,088 A | 9/2000 | Terranova | | |
| 6,938,862 B2 * | 9/2005 | Orona | .................. | B60N 2/4666 248/118 |
| 7,384,092 B2 * | 6/2008 | Hodges | ...................... | B60J 5/06 296/1.09 |
| 7,484,809 B2 | 2/2009 | Hughes | | |
| 7,748,769 B2 | 7/2010 | Sommer et al. | | |
| 2004/0017094 A1 | 1/2004 | Bruton | | |
| 2009/0256384 A1* | 10/2009 | Hughes, Jr. | .......... | B60N 2/4235 296/153 |
| 2014/0132046 A1 | 5/2014 | Driscoll | | |
| 2015/0097392 A1* | 4/2015 | Locke | .................... | B60N 2/466 296/153 |
| 2015/0173325 A1* | 6/2015 | Burns Baker | .......... | A01K 1/035 296/1.09 |

FOREIGN PATENT DOCUMENTS

DE   WO 03080387 A1 *  10/2003  ........... B60N 2/4666

* cited by examiner

*Primary Examiner* — Lori L Lyjak
(74) *Attorney, Agent, or Firm* — Christopher R. Ganter, LLC (57) ABSTRACT

An armrest for a vehicle door that is removable and versatile for either a left or right vehicle door is a horizontal support having a support bracket attached to its bottom surface at an outer edge disposed to be inserted into the space between an automobile window and an inner door surface thereby allowing said horizontal support to rest upon an inner door sill for support. The horizontal support also has apertures for installing a stability bracket onto its underside that is adjustable and complements the support bracket by using a secured frictional force against an interior automobile door wall thereby allowing a user to rest their arm in comfort thereupon. A removable cushion can be installed onto the horizontal support to increase comfort to a user.

20 Claims, 9 Drawing Sheets

FIG. 10

VERSATILE ARM REST FOR A VEHICLE

CROSS-REFERENCED TO RELATED APPLICATIONS

None

FEDERALLY SPONSORED RESEARCH

None

SEQUENCE LISTING

None

FIELD OF THE INVENTION

The present invention relates to an armrest that is adapted to be installed on to the interior of a vehicle door for the purpose of providing comfortable arm support for a driver or passenger. The armrest is intended for a passenger's arm closest to the door.

BACKGROUND OF THE INVENTION

While there are a number of armrests known in the art that can be installed onto a car door interior, none provide a truly secure and stable armrest in an economical fashion. Further, most armrests do not provide adequate surface area to occupy a user's arm. One of the difficulties in designing armrests that can be attached and removed from a vehicle door is the differing shapes and configurations of the interior surface of vehicle doors. Some doors have a very narrow horizontal interior surface closest to the window that renders many existing armrests inadequate because they are not equipped with an integrated support system to make up for the lost horizontal surface that they depend upon for maximum stability. Other armrests lack the means to adapt to an undulating inner vehicle door surface where various controls, contours and handles may obstruct proper door surface contact. What is needed in the art is a removable armrest that is compatible with a wide variety of interior vehicle door shapes that can simultaneously be secured to said door so that the armrest is substantially solid to support a user's arm weight.

SUMMARY OF THE INVENTION

The present invention is a removable armrest adapted to be inserted on the interior of a vehicle door and more specifically has a horizontal support, a support bracket formed by a first and second plate whereby the first plate is attached to the bottom surface of the horizontal support and the second plate is adapted to be inserted into the space between a automobile window and an inner door surface. The support bracket keeps the horizontal support in position and thus allows the bottom surface of the horizontal support to rest upon the inner window sill of an inner vehicle door.

The horizontal support also has a stability bracket that is adjustable to various vehicle doors and allows a lateral force in the direction of the vehicle door to be applied to the inner vehicle door wall. The support bracket and the stability bracket work in combination to provide the required rigidity to support a user's arm without becoming dislodged. The lateral force that the stability bracket applies to the inner vehicle door wall produces a frictional connection with the inner vehicle door wall. This frictional connection in turn produces an opposing force to the downward vertical force of the weight of a user's arm and the weight of the horizontal support.

The horizontal support can be fabricated by several different methods that are known in the art from materials such as polyethylene, nylon, polypropylene, ABS plastic, fiberglass, carbon fiber, metal, or wood. The horizontal support has a distal end adapted to occupy a user's hand, a proximal end adapted to occupy a user's elbow and a narrower central region to occupy the arm of the user. The horizontal support also has a cushion that has a cushion cover, and a padded portion insertable into the interior of the cushion cover through an opening in the bottom surface of the cushion cover. The cushion cover also has on its bottom surface a pocket at its proximal end and a pocket at its distal end, said pockets made of flexible material thus allowing the cushion to be mounted onto the horizontal support for a user's comfort by inserting the distal and proximal ends of the horizontal support into said pockets allowing the cushion to rest on top of the horizontal support.

All of these features and advantages of the present invention, and more, are illustrated below in the drawings and detailed description that follows.

DETAILED DESCRIPTION OF THE INVENTION

Figure 1:
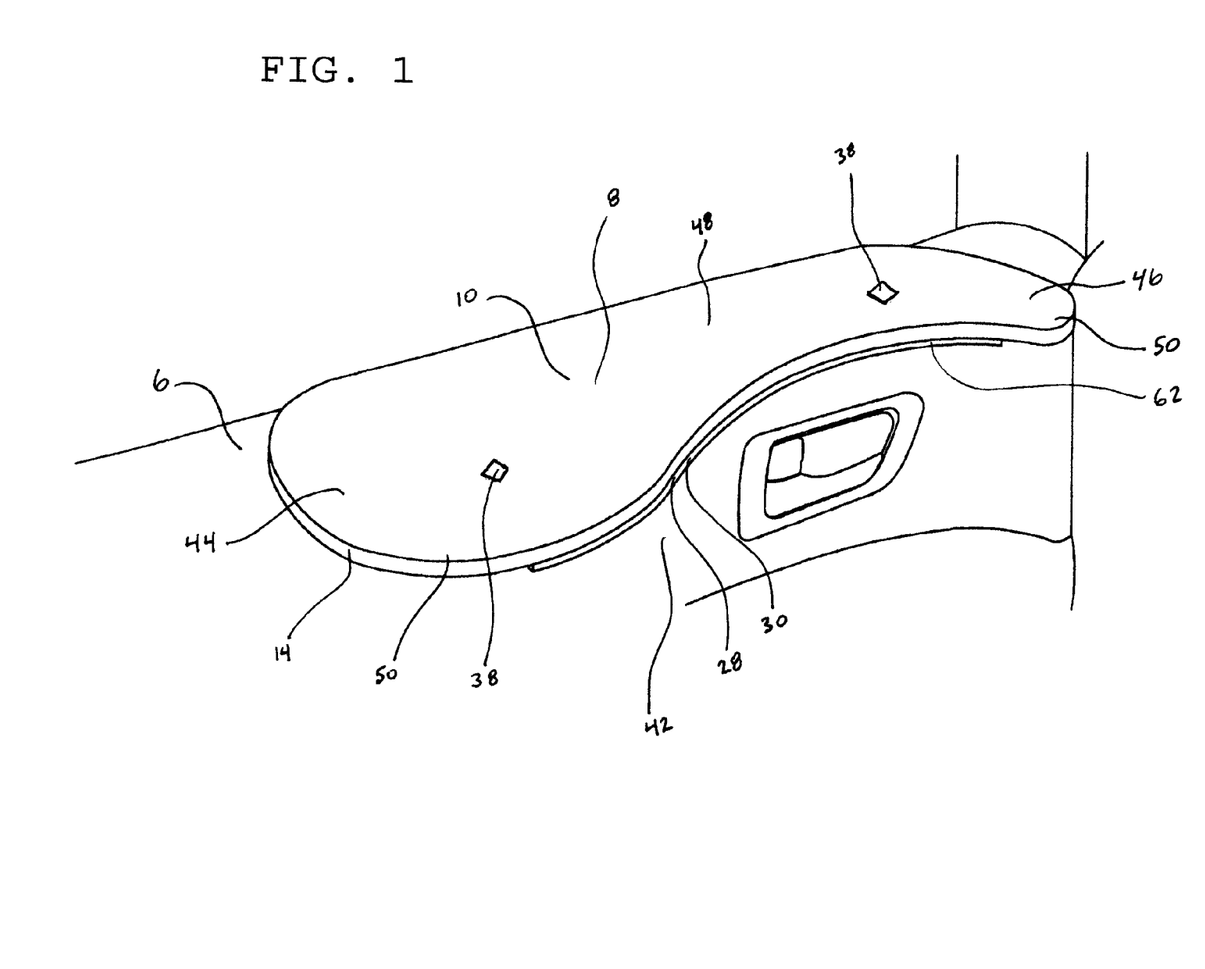
FIG. 1 shows a perspective view of the armrest installed onto a vehicle door.

FIG. 1 shows a perspective view of the armrest installed onto a vehicle door window sill 6. The armrest comprises a horizontal support 8 having an upper surface 10, a bottom surface 12 and an outer edge 14. The horizontal support has a proximal end 44, a distal end 46 and a central portion 48. The proximal end 44 and the distal end 46 of the horizontal support 8 have their outer edge 14 shaped in a circular flare 50 whereby they proceed to narrow the width of the horizontal support 8 as the outer edge 14 approaches the central portion 48 of the horizontal support 8. The horizontal support 8 can be fabricated by several different methods that are known in the art from materials such as polyethylene, nylon, polypropylene, ABS plastic, fiberglass, carbon fiber, metal, or wood. In a preferred embodiment, ABS plastic would be used for fabricating the horizontal support 8.

Located on the upper surface 10 of the horizontal support 8 are apertures 38 for receiving means for fastening 40 a stability bracket 28 at a desired location on an interior automobile door wall 42. Fastening means 40 would typically be a bolt and a threaded bolt receptacle such as a nut, a wing-nut, or a knob with receiving threads that correspond to the threaded bolt. While the fastening means can be made of metal, in a preferred embodiment the fastening means consist of a nylon carriage bolt and a nylon wing-nut wherein the nylon carriage bolt has rectangular edges below its head to align with a rectangular shape of an aperture 38. The stability bracket 28 top plate 30 has a concave outer edge 62 formed to conform with the outer edge 14 of the horizontal support 8. The stability bracket 28 can be fabricated of ABS plastic as well as other materials such as polyethylene, nylon, polypropylene, fiberglass, carbon fiber, metal, or wood. In use, the armrest can be located on any door in a given automobile due to its versatile design allowing it to be rotated 180 degrees to accommodate either a left vehicle door or a right vehicle door.

Figure 2:
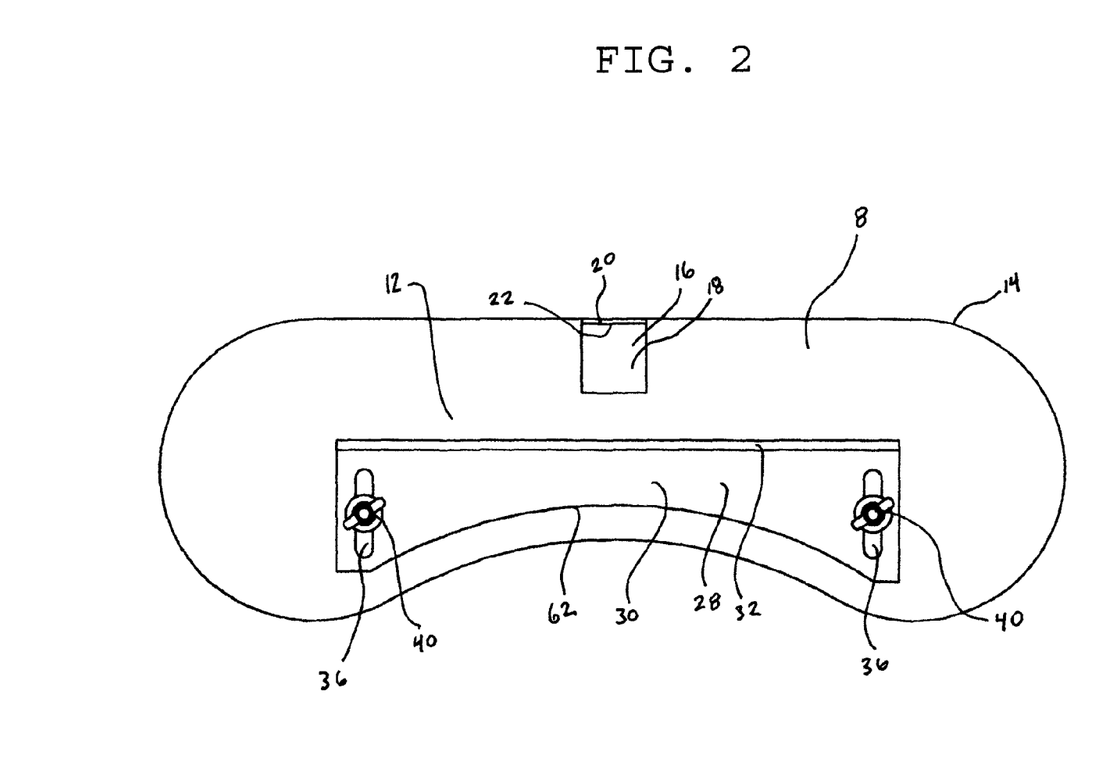
FIG. 2 shows a bottom plan view of the armrest.

FIG. 2 shows a bottom plan view of the horizontal support 8 bottom surface 12 with an installed support bracket 16 and an installed stability bracket 28. The support bracket 16 has a first plate 18 and a second plate 20 and a junction 22 whereby the first plate 18 is inserted into the space between an automobile window 24 and an inner door surface 26. The second plate 20 is secured to the bottom surface 12 of the horizontal support 8 by securing means, namely, by chemically bonding the support bracket 16 to the horizontal support 8 with an agent such as glue, epoxy, cement or other similar bonding agents. In one embodiment, the support bracket 16 is located in close proximity to the outer edge 14 of the horizontal support 8 in a central location on the bottom surface 12 of the horizontal support 8 The second plate 20 of the support bracket 16 can also be attached by means of securing with various types of screws and bolts. In an alternate embodiment, the fastening means are aluminum binding posts or Chicago screws whereby small apertures are formed in the horizontal support 8 and the support bracket 16 and these fastening means are inserted through and tightened. The support bracket 16 first plate 18 should be anywhere from two to three inches in length and 1.5 to 2.5 inches wide. The second plate 20 of the support bracket 16 should have a length of 2 to 4 inches and a width of 1.5 to 2.5 inches.

The stability bracket 28 has a top plate 30 and a side plate 32 wherein there are elongated channels 36 formed in said top plate 30 such that they can accommodate means for adjusting and securing 40 said stability bracket 28. Said elongated channels 36 are in a plane that is perpendicular to the side plate 32. Said means for adjusting and securing 40 includes the use of the elongated channels 36 with bolts and nuts, wing-nuts or threaded knobs. The bolts can also be a carriage bolt whereby the rectangular configuration near the head of the carriage bolt fits into the apertures 38, as shown in FIG. 1, whereby the apertures 38 have a matching rectangular configuration such that they do not spin when connecting the nut, wing-nut or threaded knob to the carriage bolt. In a preferred embodiment, said means for adjusting and securing 40 is the use of nylon carriage bolts with nylon wing-nuts in coordination with the elongated channels 36. The stability bracket 28 top plate 30 also has a concave outer edge 62 this is conformed to match the outer edge 14 of the horizontal support 8. The stability bracket 28 should not exceed the length of the horizontal support 8 and in a preferred embodiment should be anywhere from 8 to 13 inches in length.

Figure 3:
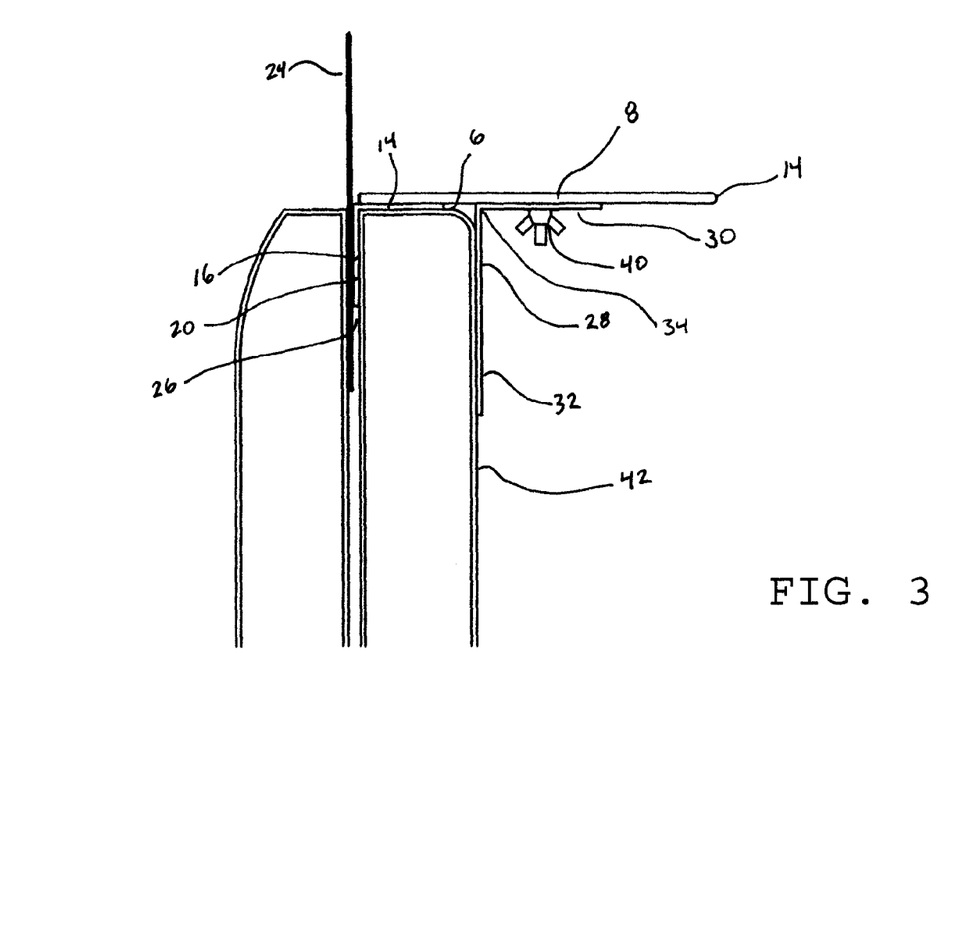
FIG. 3 shows a cross-section side view of an embodiment of the armrest installed onto a vehicle door.

The elongated channels 36 shown in FIG. 2 and the apertures 38 as shown in FIG. 1 should be located in the stability bracket 28 and the horizontal support 8, respectively, so that they align with each other and prevent the adjustment of the stability bracket 28 top plate 30 concave outer edge 62 from extending past the outer edge 14 of the horizontal support 8. Specifically, in a preferred embodiment the apertures 38 would be located a distance from the outer edge 14 of the horizontal support 8 such that the length from the apertures 38 to the outer edge 14 of the horizontal support 8 is equal to or greater than the length of the elongated channels 36 in the stability bracket 28 along with the additional length of the stability bracket 28 between the end of the elongated channel 36 and the concave outer edge FIG. 3 shows a cross-section side-view of the armrest installed onto an automobile door. Specifically, shown therein is the armrest with the horizontal support 8 attached to the support bracket 16 and the stability bracket 28 side plate 32 engaged against an interior automobile door wall 42. Also shown therein is the stability bracket 28 junction 34 between the top plate 30 and the side plate 32. The stability bracket 28 top plate 30 is adjusted and secured by said adjustment and securing means 40 described herein. The second plate 20 of the support bracket 16 is installed in between an automobile window 24 and an inner door surface 26. The first plate 18 of the support bracket 16 is secured to the horizontal support 8 where said horizontal support is resting upon an inner window sill 6.

The support bracket 16 and the stability bracket 28 work in combination to provide the required rigidity to support a user's arm so that the armrest does not dislodge. The lateral force that the stability bracket 28 applies to the inner automobile door wall 42 produces a frictional connection between the side plate 32 of the stability bracket 28 and the inner automobile door wall 42. This frictional connection in turn produces an opposing force to the downward vertical force of the weight of a user's arm and the weight of the horizontal support 8. The stability bracket 28 supplements the support bracket 16 in keeping the horizontal support 8 secure in a fixed position. The outer edge 14 of the horizontal support 8 extends away from the automobile door.

Figure 4:
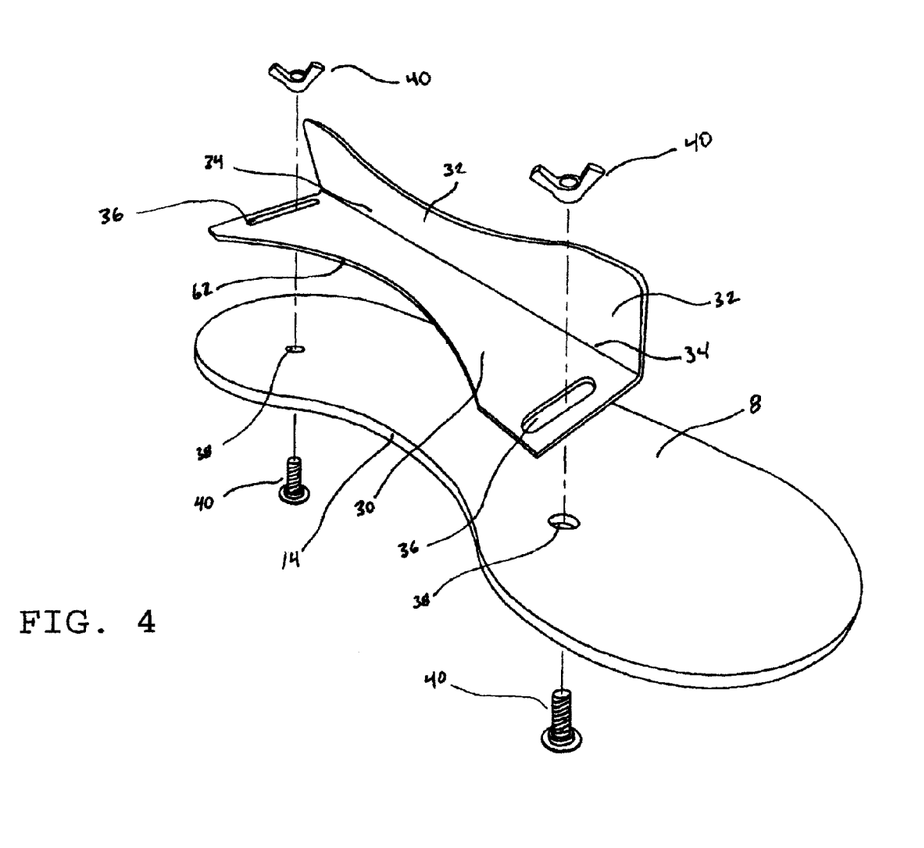
FIG. 4 shows a bottom perspective exploded view of the armrest and stability bracket.

FIG. 4 shows a bottom perspective exploded view of the armrest and stability bracket 28 wherein said adjustment and securing means 40 herein identified as bolts and nuts, wing-nuts or threaded knobs are installed through apertures 38 of the horizontal support 8 and then the elongated channels 36 located in the top plate 30 of the stability bracket 28 and then completing the connection with said nuts, wing-nuts or threaded knobs. Further shown is the concave outer edge 62 of the stability bracket 28 along with the top plate 30, the side plate 32 and the junction 34 between the top plate 30 and the side plate 32. The adjustment and securing means 40 allow the stability bracket 28 to be adjusted such that the armrest is in a fixed position. The stability bracket 28 movement is guided by the elongated channels 36 and is governed by the length of said elongated channels 36 such that the stability bracket does not exceed past the outer edge 14 of the horizontal support 8.

As shown in FIG. 4 the stability bracket 28 has one elongated channel 36 at one end of the top plate 30 of the stability bracket 28 and another channel 36 at the other end of the top plate 30. Due to the location of the channels 36 in the top plate 30, each elongated channel 36 located at either end of the stability bracket 28 can accommodate different adjustment depths against an interior automobile door wall 42 as the bolts can act as pivots because the elongated channels 36 are slightly wider than the bolts inserted through thereby introducing a sufficient amount of flexibility into how the stability bracket 28 can be adjusted.

Figure 5:
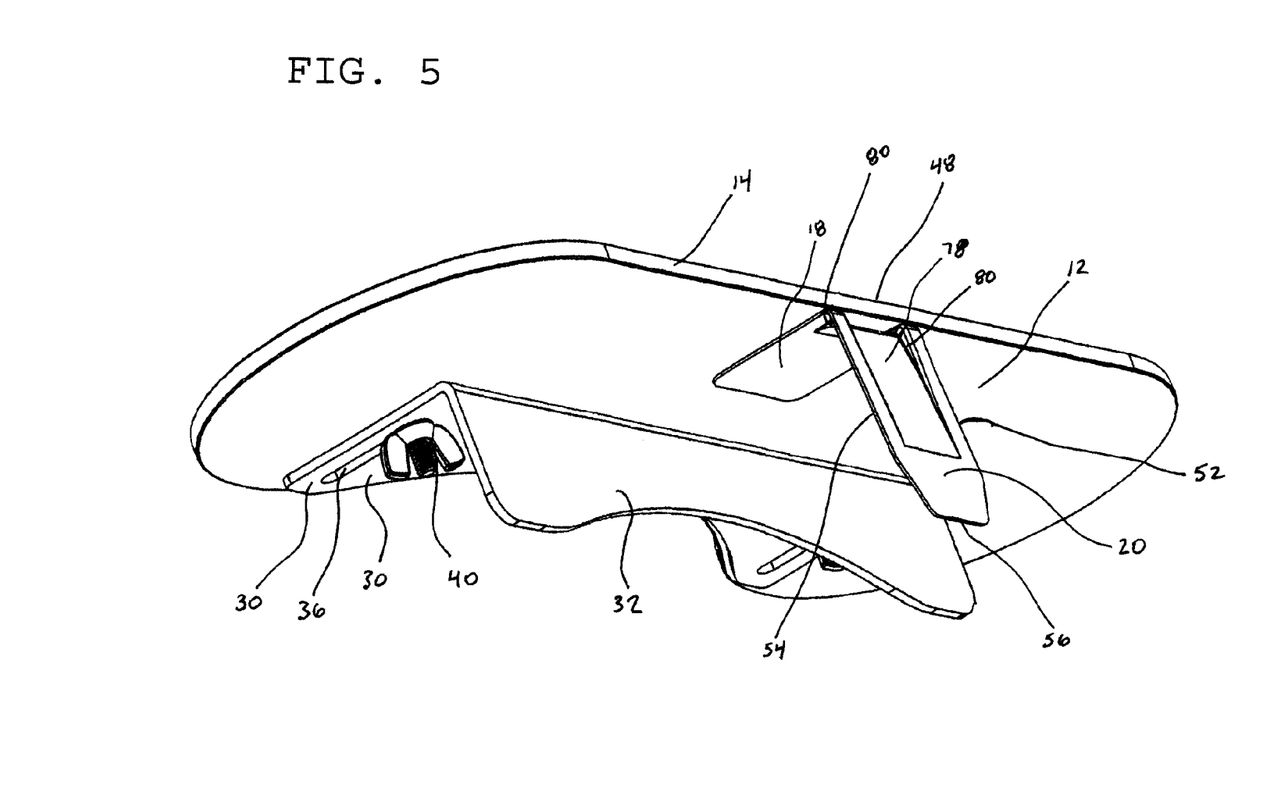
FIG. 5 shows a bottom perspective view of the armrest.

FIG. 5 shows a bottom perspective view of the armrest showing the horizontal support 8, the stability bracket 28 top plate 30 and side plate 32, elongated channels 36 and means for adjustment and securing 40 of said stability bracket 28. Also shown therein is the support bracket 16 first plate 18 and second plate 20 whereby the second plate 20 and first plate 18 has a depressed central region 78. The second plate 20 also has a right edge 52 a left edge 54 and a leading edge 56 that is introduced into the space between an automobile window 24 as shown in FIG. 3 and an inner door surface area 26. Connecting the depressed central region 78 to the second plate 20 and first plate 18 surface are gussets 80. The gussets are substantially perpendicular to the plane of the first plate 18 and the second plate 20 and offer additional rigidity to the support bracket 16 such that a material such as ABS plastic can be used and still maintain sufficient strength. The use of ABS plastic for the support bracket 16 is advantageous because it will not scratch an automobile window 24, however support must be built into the support bracket 16 fabricated of ABS plastic to provide adequate support and rigidity. The depressed central region 78 gives rise to the formation of gussets 80 as a connection between the central depressed region 78 and the first plate 18 and second plate 20. The gussets 80 add support and rigidity to a support bracket 16 fabricated of ABS plastic. The ABS plastic support bracket 16 is secured to the bottom surface 12 of the horizontal support 8 near the outer edge 14 and in the center of the central portion 48 of the horizontal support 8. As discussed above in reference to FIG. 2, the second plate 20 is secured to the bottom surface 12 of the horizontal support 8 by securing means, namely, by chemically bonding the support bracket 16 to the horizontal support 8 with an agent such as glue, epoxy, cement or other similar bonding agents.

Figure 6:
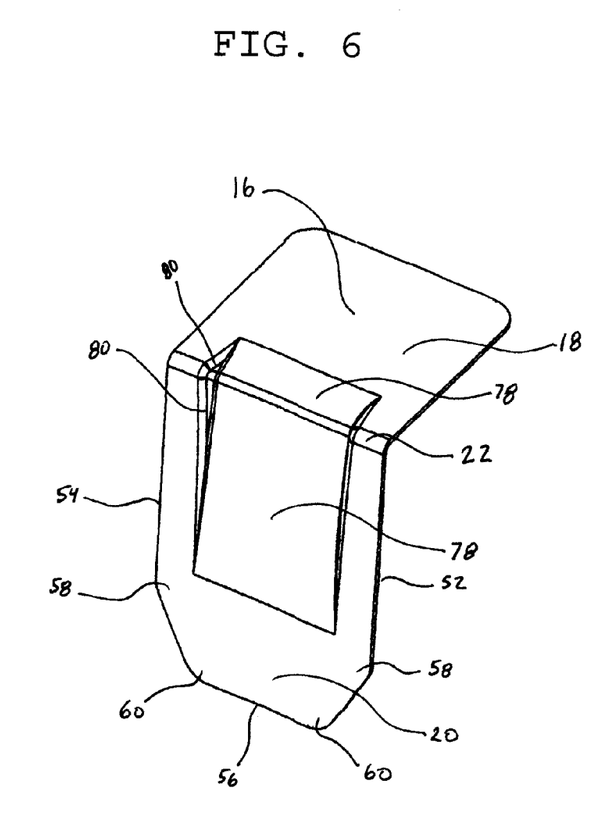
FIG. 6 shows a perspective view of a preferred embodiment of the support bracket

FIG. 6 shows a perspective view of a preferred embodiment of the support bracket 16 wherein the first plate 18 and second plate 20 have a junction 22 and have a central depressed region 78. The central depressed region 78 of the first plate 18 and second plate 20 are attached to the first plate 18 and the second plate 20 by way of gussets that are substantially perpendicular to the plane of the first plate 18 and the plane of the second plate 20. The second plate has a right edge 52, a left edge 54 and a leading edge 56. The right edge 52 and left edge 54 extend a length down and in a direction opposite of the junction 22 and then said right edge 52 and left edge 54 angle inwards toward each other on a new trajectory such than an obtuse angle 58 is formed between the original trajectory of the right edge 52 and the left edge 54 and the new trajectory and said right edge 52 and left edge 54 terminate into the leading edge 56 such than obtuse angle 60 is created at the junction of the right edge 52 and the leading edge 56 and an obtuse angle 60 is created at the junction of the left edge 54 and the leading edge 56. The leading edge 56 is an initially narrower edge which promotes insertion of the second plate 20 of the support bracket 16 into the space between an automobile window 24 and an inner door surface 26 as shown in FIG. 3 because of the reduced surface area of the leading edge 56 as compared to the width of the second plate 20 of the support bracket 16.

Figure 7:
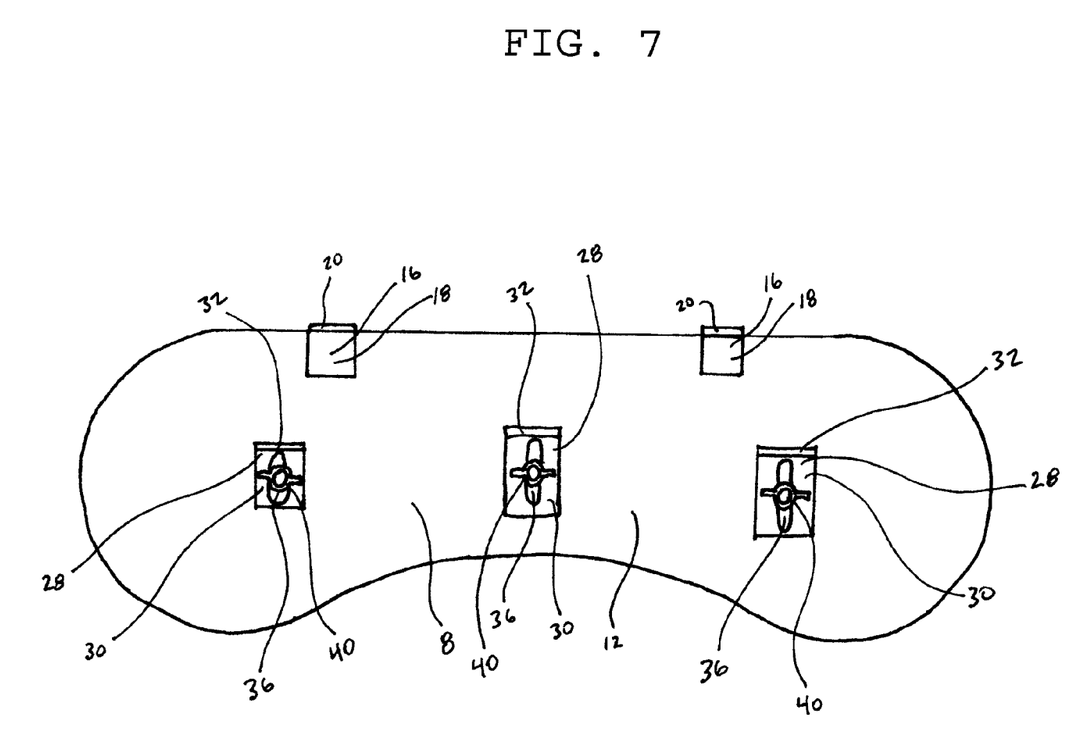
FIG. 7 shows a bottom plan view of an alternate embodiment of the armrest.

FIG. 7 shows a bottom plan view of an alternate embodiment of the armrest wherein a plurality of support brackets 16 and stability brackets 28 are employed. Specifically FIG. 7 shows two support brackets 16 with a first plate 18 a second plate 20 and a junction 22 where said first plate 18 and second plate 20 meet and said first plate 18 attached to the bottom surface 12 of the horizontal support 8. In addition, three stability brackets 28 are used having a top plate 30, a side plate 32 and an elongated channel 36 located in each stability bracket 28. The stability brackets 28 can be adjusted and secured independently from each other using means 40 that are defined as bolts and nuts, wing-nuts or threaded knobs. This configuration allows adjustment and securing of the armrest onto an automobile door where the interior automobile door wall 42 undulates.

Figure 8:
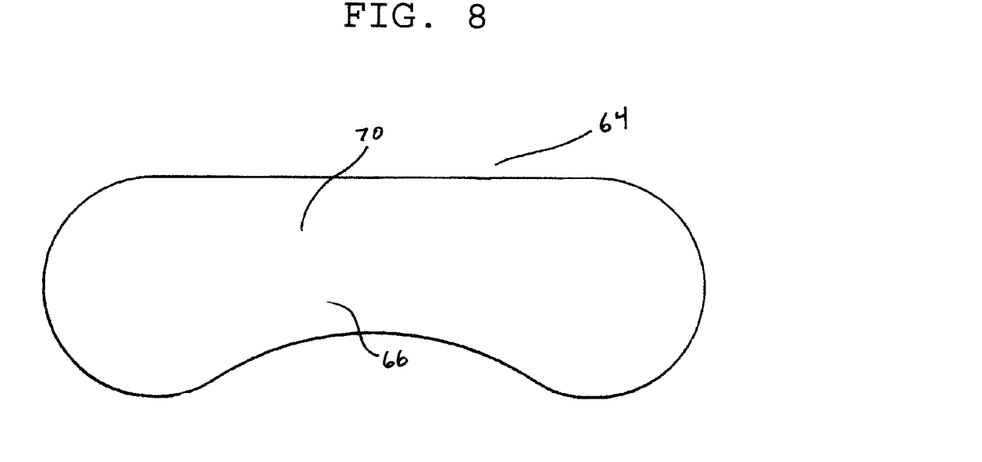
FIG. 8 shows a top plan view of an armrest cushion.

FIG. 8 shows a top plan view of a cushion 64 for the armrest said cushion comprising a cushion cover 66 having a top surface 70 conformed to fit onto to the horizontal support 8.

Figure 9:
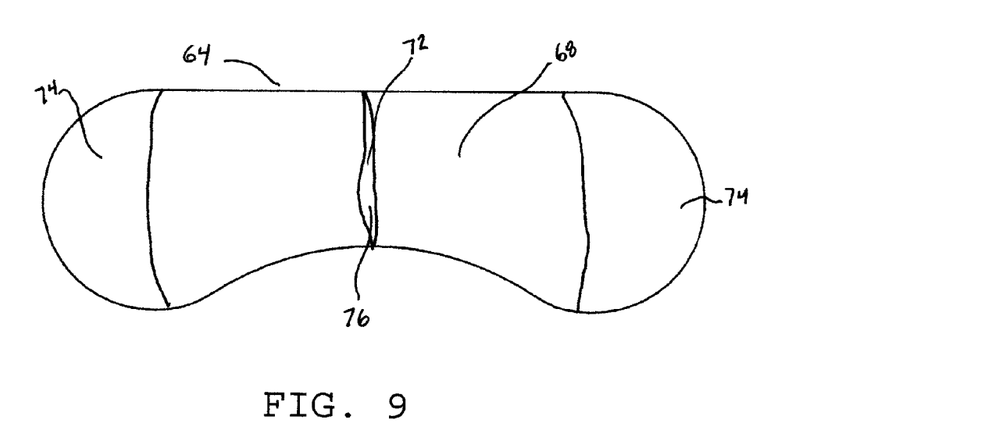
FIG. 9 shows a bottom plan view of an armrest cushion.

Referring now to FIG. 9, therein is shown a bottom plan view of the cushion 64 having a cushion cover 66 bottom surface 68 and an opening 76 for the installment of a padded portion 72 and pockets 74 located on either end of said cushion 64. The cushion cover top surface 70 and cushion cover 66 bottom surface 68 can be made of numerous types of cloth fabrics, leather, synthetic or authentic animal furs and rubber or other similar textured materials. The cushion cover 66 bottom surface 68 is shaped to adapt to the horizontal support 8 as is the cushion cover 66 top surface 70. The cushion cover 66 top surface 70 is joined to the bottom surface 68 by means of sewing. The pockets 74 are pieces of fabric, preferably a stretchable fabric such as spandex, that are cut to conform to the proximal end 44 and the distal end 46 of the horizontal support 8 as shown in FIG. 1. The pockets 74 are then sewn onto the cushion cover 66 bottom surface 68 at the proximal end 44 and the distal end 46 of the horizontal support 8. The pockets 74 allow the cushion 64 to be installed onto the horizontal support 8.

Figure 10:
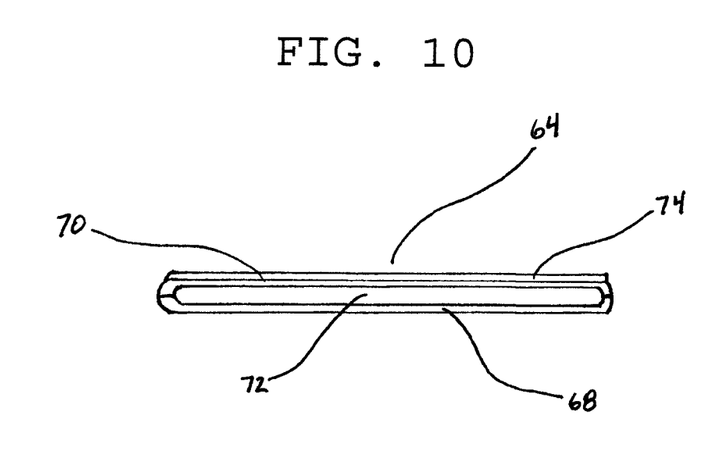
FIG. 10 shows a cross section of the armrest cushion.

Referring now to FIG. 10, there is shown a cross-section of the cushion 64 having a cushion cover 66 bottom surface 68 and top surface 70, a pocket 74 and a padded portion 72.

The principles, embodiments, and modes of operation of the present invention have been set forth in the foregoing specification. The embodiments disclosed herein should be interpreted as illustrating the present invention and not as restricting it. The foregoing disclosure is not intended to limit the range of equivalent structure available to a person of ordinary skill in the art in any way, but rather to expand the range of equivalent structures in ways not previously contemplated. Numerous variations and changes can be made to the foregoing illustrative embodiments without departing from the scope and spirit of the present invention.

What is claimed is:

1. An automobile armrest, comprising:
   a substantially horizontal support comprised of an upper surface, a bottom surface and an outer edge;
   a support bracket formed by a first plate and a second plate that meet at a junction;
   said first plate of the support bracket is adapted to be attached to the bottom surface of said horizontal support and in close proximity to the outer edge in a central region of the substantially horizontal support;
   said second plate of the support bracket adapted to be inserted between an automobile window and an inner door surface thereby allowing the horizontal support bottom surface to rest upon an inner window sill of an automobile door;
   a stability bracket formed by a top plate and a side plate that meet at a junction;
   said top plate of said stability bracket has a plurality of elongated channels formed in said top plate of said stability bracket in a configuration that is perpendicular to the plane of the side plate;
   apertures formed though said horizontal support that align with said elongated channels;
   means for adjusting and securing said stability bracket into a rigid position against an interior automobile door wall; and
   means for securing said support bracket to said horizontal support.

2. The armrest of claim 1 wherein the horizontal support has a proximal end portion, a distal end portion and a central portion, said proximal end portion having a substantially circular flare to accommodate a user's elbow, said distal end portion having a substantially circular flare to accommodate a user's hand and said central portion having a narrower width than the width of the proximal end portion and the distal end portion, said outer edge of central portion of horizontal support closest to a user is concave.

3. The armrest of claim 2 wherein the second plate of the support bracket has a right edge, a left edge and a leading edge, said right edge and said left edge extending on an original trajectory for a distance down said second plate, and then said right edge and said left edge angling inwards toward each other on a new trajectory such that an obtuse angle is formed between the original trajectory and the new trajectory of both the left and right edge, and an obtuse angle formed between the right edge and the leading edge and the left edge and the leading edge of the support bracket second plate.

4. The armrest of claim 3 wherein the stability bracket top plate has a concave outer edge that conforms to the outer edge of said central region of the horizontal support.

5. The armrest of claim 4 wherein the stability bracket has a length of 8 to 13 inches.

6. The armrest of claim 5 wherein the apertures in the horizontal support are rectangular in shape.

7. The armrest of claim 6 wherein the apertures in the horizontal support are located in a position that will prevent the concave outer edge of the top plate of the stability bracket to extend beyond the outer edge of the horizontal support.

8. The armrest of claim 7 wherein the channels in the top plate of the stability bracket are of a length that will prevent the concave outer edge of the top plate of the stability bracket from extending beyond the horizontal support outer edge.

9. The armrest of claim 8 further comprising a cushion adapted to fit onto the horizontal support.

10. The armrest of claim 9 wherein said cushion has a cushion cover having a bottom surface and a top surface conformed to the dimensions of the horizontal support, a padded portion adapted to fit inside the cushion cover, said cushion cover bottom surface and top surface encapsulating the padded portion by joining together the cushion cover bottom surface and cushion cover top surface, said cushion cover further comprising pockets where one pocket is located on the bottom cushion cover surface at the distal end of the horizontal support and one pocket is located on the bottom cushion cover surface at the proximal end of the horizontal support and said cushion cover bottom surface having an opening for installment of a padded portion.

11. The armrest of claim 10 wherein the support bracket has a depressed central region in the first plate and in the second plate and further comprising two gussets that form a connection with said depressed central region and first plate and the second plate, said gussets being substantially perpendicular to the plane of the first plate and the second plate.

12. The armrest of claim 11 wherein the support bracket is made of plastic.

13. The armrest of claim 1 further comprising a cushion adapted to fit onto the horizontal support.

14. The armrest of claim 13 wherein said cushion has a cushion cover having a bottom surface and a top surface conformed to the dimensions of the horizontal support, a padded portion adapted to fit inside the cushion cover, said cushion cover bottom surface and top surface encapsulating the padded portion by joining together the cushion cover bottom surface and cushion cover top surface, said cushion cover further comprising pockets where one pocket is located on the bottom cushion cover surface at the distal end of the horizontal support and one pocket is located on the bottom cushion cover surface at the proximal end of the horizontal support and said cushion cover bottom surface having an opening for installment of a padded portion.

15. The armrest of claim 14 wherein the support bracket has a depressed central region in the first plate and in the second plate and further comprising two gussets that form a connection with said depressed central region and first plate and the second plate, said gussets being substantially perpendicular to the plane of the first plate and the second plate.

16. A removable vehicle armrest, comprising:
a substantially horizontal support comprised of an upper surface, a bottom surface and an outer edge;
one or more support brackets formed by a first plate and a second plate that meet at a junction;
said first plate of the support brackets are adapted to be attached to the bottom surface of said substantially horizontal support and in close proximity to the outer edge of the substantially horizontal support closest to an automobile door;
said second plate of the support brackets adapted to be inserted between an automobile window and an inner door surface thereby allowing the horizontal support bottom surface to rest upon an inner window sill of an automobile door;
one or more stability brackets formed by a top plate and a side plate that meet at a junction;
said top plates of said stability brackets has at least one elongated channel formed in said top plate of each said stability bracket in a configuration that is perpendicular to the plane of the side plate;
apertures formed though said horizontal support that align with said elongated channels;
means for adjusting and securing said stability bracket into a rigid position against an interior automobile door wall; and
means for securing said support bracket to said horizontal support.

17. The armrest of claim 16 further comprising a cushion adapted to fit onto the horizontal support.

18. The armrest of claim 17 wherein said cushion has a cushion cover having a bottom surface and a top surface conformed to the dimensions of the horizontal support, a padded portion adapted to fit inside the cushion cover, said cushion cover bottom surface and top surface encapsulating the padded portion by joining together the cushion cover bottom surface and cushion cover top surface, said cushion cover further comprising pockets where one pocket is located on the bottom cushion cover surface at the distal end of the horizontal support and one pocket is located on the bottom cushion cover surface at the proximal end of the horizontal support and said cushion cover bottom surface having an opening for installment of a padded portion.

19. The armrest of claim 18 wherein the horizontal support has a proximal end portion, a distal end portion and a central portion, said proximal end portion having a substantially circular flare to accommodate a user's elbow, said distal end portion having a substantially circular flare to accommodate a user's hand and said central portion having a narrower width than the width of the proximal end portion and the distal end portion, said outer edge of the central portion of the horizontal support closest to a user is concave.

20. The armrest of claim 16 wherein each support bracket has a depressed central region in the first plate and in the second plate and further comprising two gussets that form a connection with said depressed central region and first plate and the second plate, said gussets being substantially perpendicular to the plane of the first plate and the second plate.

\* \* \* \* \*